(12) United States Patent
Faymonville

(10) Patent No.: US 9,533,706 B2
(45) Date of Patent: Jan. 3, 2017

(54) AXLE SUSPENSION

(71) Applicant: J.G.B.D. Consult Sprl, Lummen (BE)

(72) Inventor: Alain Faymonville, Weiswampach (LU)

(73) Assignee: J.G.B.D. Consult Sprl, Lummen (BE)

( * ) Notice: Subject to any disclaimer, the term of this patent is extended or adjusted under 35 U.S.C. 154(b) by 0 days.

(21) Appl. No.: 14/817,417

(22) Filed: Aug. 4, 2015

(65) Prior Publication Data

US 2016/0236709 A1   Aug. 18, 2016

(30) Foreign Application Priority Data

Feb. 18, 2015   (DE) .................. 20 2015 100 777 U

(51) Int. Cl.
| | | |
|---|---|---|
| *B62D 7/02* | (2006.01) | |
| *B60B 35/10* | (2006.01) | |
| *B62D 7/04* | (2006.01) | |
| *B62D 7/20* | (2006.01) | |
| *B62D 63/06* | (2006.01) | |
| *B60G 3/14* | (2006.01) | |

(52) U.S. Cl.
CPC .............. *B62D 7/023* (2013.01); *B60B 35/10* (2013.01); *B60G 3/145* (2013.01); *B62D 7/026* (2013.01); *B62D 7/04* (2013.01); *B62D 7/20* (2013.01); *B62D 63/068* (2013.01); *B60G 2200/132* (2013.01); *B60G 2200/44* (2013.01); *B60G 2300/36* (2013.01); *B60G 2300/37* (2013.01)

(58) Field of Classification Search
CPC ..... B62D 21/14; B62D 53/067; B62D 53/061; B60B 35/1054; B60B 11/02; B60B 35/1027
See application file for complete search history.

(56) References Cited

U.S. PATENT DOCUMENTS

| | | | | |
|---|---|---|---|---|
| 4,221,398 A | * | 9/1980 | Pautrat | B60P 3/064 280/444 |
| 4,652,004 A | * | 3/1987 | Wirth | B62D 1/28 180/168 |
| 5,282,644 A | * | 2/1994 | Larson | B60B 35/001 180/209 |
| 5,326,128 A | * | 7/1994 | Cromley, Jr. | B60G 3/145 180/906 |
| 5,489,113 A | * | 2/1996 | Torborg | B60B 35/003 180/209 |
| 6,139,045 A | * | 10/2000 | Vandenbark | B60B 35/003 180/209 |
| 6,199,769 B1 | * | 3/2001 | Weddle | B60G 17/0416 180/906 |
| 8,517,135 B2 | * | 8/2013 | Schapf | B60G 3/20 180/233 |

(Continued)

FOREIGN PATENT DOCUMENTS

| | | | |
|---|---|---|---|
| CA | 2 892 743 A1 | 6/2014 | |
| DE | 20 2013 011 633 U1 | 3/2014 | |
| DE | EP 2918480 A2 | * 9/2015 | ........... B62D 13/025 |

*Primary Examiner* — Darlene P Condra
(74) *Attorney, Agent, or Firm* — Collard & Roe, P.C.

(57) ABSTRACT

An axle suspension has an axle support mounted in a swivel so as to rotate about an axis of rotation and a steering lever that is connected with the axle support in torque-proof manner and can be pivoted about the axis of rotation. The axle support accommodates at least one wheel axle and is mounted so as to be displaceable relative to the axis of rotation, in the wheel axle direction, on an adjustment path.

16 Claims, 5 Drawing Sheets

(56) References Cited

U.S. PATENT DOCUMENTS

| | | | |
|---|---|---|---|
| 2005/0039278 A1* | 2/2005 | Riach | B60B 35/003 |
| | | | 15/87 |
| 2015/0042068 A1* | 2/2015 | Nooren | B60P 3/40 |
| | | | 280/404 |
| 2015/0102593 A1* | 4/2015 | Slawson | B62D 49/0607 |
| | | | 280/830 |
| 2015/0284041 A1* | 10/2015 | Kern | B60G 7/02 |
| | | | 280/441.2 |

* cited by examiner

AXLE SUSPENSION

CROSS REFERENCE TO RELATED APPLICATIONS

Applicant claims priority under 35 U.S.C. §119 of German Application No. 20 2015 100 777.9 filed Feb. 18, 2015, the disclosure of which is incorporated by reference.

BACKGROUND OF THE INVENTION

1. Field of the Invention

The invention relates to an axle suspension and to a vehicle having at least one such axle suspension. The axle suspension has an axle support mounted in a swivel so as to rotate about an axis of rotation and a steering lever that is connected with the axle support in torque-proof manner and can be pivoted about the axis of rotation, wherein the axle support accommodates at least one wheel axle.

2. Description of the Related Art

Transport vehicles having a variable width and track width are already known from the state of the art. For example, DE 20 2013 011 633 U1 shows a transport vehicle, wherein the chassis comprises two chassis parts, which each carry a row of wheel bogies disposed one behind the other, which are adjustable transverse to a vertical longitudinal center plane of the transport vehicle, in other words in the wheel axle direction.

The solution described here, above all, has the disadvantage that an adjustment of the wheel bogies relative to the chassis also requires an adjustment of the entire steering system. Because of the widening of the vehicle frame as a whole, the geometric relationships at the axle change in such a manner that they must be compensated with a length-changeable transverse track bar, among other things. These changes on the chassis lead to an increased effort and time requirements when changing the track width.

SUMMARY OF THE INVENTION

It is therefore the task of the invention to provide an axle suspension and a vehicle having such an axle suspension, which eliminates the disadvantages described and indicates a simple and reliable solution for adaptation of the track width.

The solution for the task takes place by means of an axle suspension having the characteristics according to the invention, as well as a vehicle having at least one such axle suspension. The axle suspension has an axle support mounted in a swivel so as to rotate about an axis of rotation and a steering lever that is connected with the axle support in torque-proof manner and can be pivoted about the axis of rotation. The axle support accommodates at least one wheel axle and is mounted so as to be displaceable relative to the axis of rotation, in the wheel axle direction, on an adjustment path.

Using such an axle suspension having an axle support that is mounted so as to be displaceable relative to an axis of rotation, in the wheel axle direction, on an adjustment path, it is possible to adjust the track width of a vehicle in simple and reliable manner. No changes in the steering system are required for this purpose. In this way, a change in track width can be made in a very short time.

Embodiments of the invention are discussed below. In this connection, mounting of the axle support on the adjustment path may take place using guides on the steering lever. This arrangement represents a simple but robust design that allows a reliable change in the track width.

It is furthermore advantageous if the steering lever is configured as a steering plate and comprises a lever arm. A steering lever configured in this manner represents a particularly robust embodiment of the invention. The swivel of the axle suspension can be accommodated in the steering lever configured as a steering plate, wherein steering rods for rotating the axle suspension about the axis of rotation can be disposed on the lever arm of the steering lever.

An alternative embodiment provides that the steering lever comprises a lever arm and has an axle support accommodation that has the guide. With such an axle support accommodation, the guides can be disposed at a distance from the steering plate. This arrangement in turn has the advantage that construction space below the steering plate can be saved, because the guides, on which the axle support is mounted so as to be displaced, can be mounted ahead of the wheel axles, for example.

A further advantageous embodiment of the invention provides that the axle support can be locked in place on the adjustment path. In this way, a track width can be maintained once it has been set.

It is particularly advantageous that the axle support is infinitely adjustable on the adjustment path. In this way, any track width that is possible on the basis of the adjustment path can be set.

An alternative embodiment of the invention provides that the axle support is adjustable on the adjustment path only in steps. In this way, predefined track widths can be set, for which approval has been given by state authorities, for example.

Another advantageous embodiment provides that an adjustment device adjusts the axle support on the adjustment path. Preferably, this adjustment device can be controlled by way of a regulation unit. The adjustment device, however, can also have manual adjustment possibilities.

A further embodiment provides that the adjustment device has a threaded spindle and/or a hydraulic cylinder. Such an adjustment device allows simple and reliable adjustment of the track width at the axle suspension.

A further advantageous embodiment of the invention provides that the adjustment path amounts to between 30 cm and 95 cm, preferably 60 cm. An adjustment path designed in this way provides sufficient possibilities for adjusting the track width, without noteworthy deformations or excesses stresses coming about in the axle suspension.

Furthermore, an axle suspension in which the axle support has at least one upper axle support part and one lower axle support part and is adjustable in height is advantageous. Such a height adjustment of the axle support, advantageously driven pneumatically or hydraulically, makes it possible to even out uneven areas on the subsurface. It also makes it possible to retract the wheel axle in such a form that the axle, carried by other wheel axles on the chassis, is lifted up off the ground. Such an axle suspension in the retracted state can be changed with regard to the track width in particularly simple manner. Thus, in this case, the axle support can be displaced on the guides with little effort, on the displacement path, in the wheel axle direction.

Furthermore, a vehicle having at least one axle suspension already described here and described below is particularly advantageous, wherein as a function of the load to be accommodated by the vehicle and of the size, the number of axle suspensions can be increased.

An advantageous embodiment provides that at least one steering rod transfers steering movements to the axle suspension, by way of the steering lever. Because of the embodiment of the axle suspensions according to the invention, the steering rod does not need to be adapted when changes in the track width of the vehicle occur. The steering movements that are transferred by the steering rod remain the same, because the change in track width does not have any influence on the geometric arrangement of steering rod, steering lever, and axis of rotation.

It is particularly advantageous for a vehicle if two axle suspensions that lie opposite one another in the direction of travel, proceeding from the vehicle center, are disposed in a common vehicle plane. This vehicle axis offers a particularly good distribution of force within the vehicle chassis, because the wheel axles of the axle suspensions are directed coaxial to one another, and this arrangement clearly increases the forces that can be absorbed by the vehicle chassis.

It is furthermore advantageous that the vehicle has at least two vehicle axles. The weight that can be accommodated by the vehicle chassis can be increased accordingly by means of multiple vehicle axles disposed one behind the other.

BRIEF DESCRIPTION OF THE DRAWINGS

Further characteristics, details, and advantages of the invention are evident from the following description and using the drawings. The exemplary embodiments of the invention are shown purely schematically in the following drawings, and will be described in greater detail below. Objects or elements that correspond to one another are provided with the same reference symbols in all the figures.

In the drawings.

DETAILED DESCRIPTION OF PREFERRED EMBODIMENTS

Figure 1:
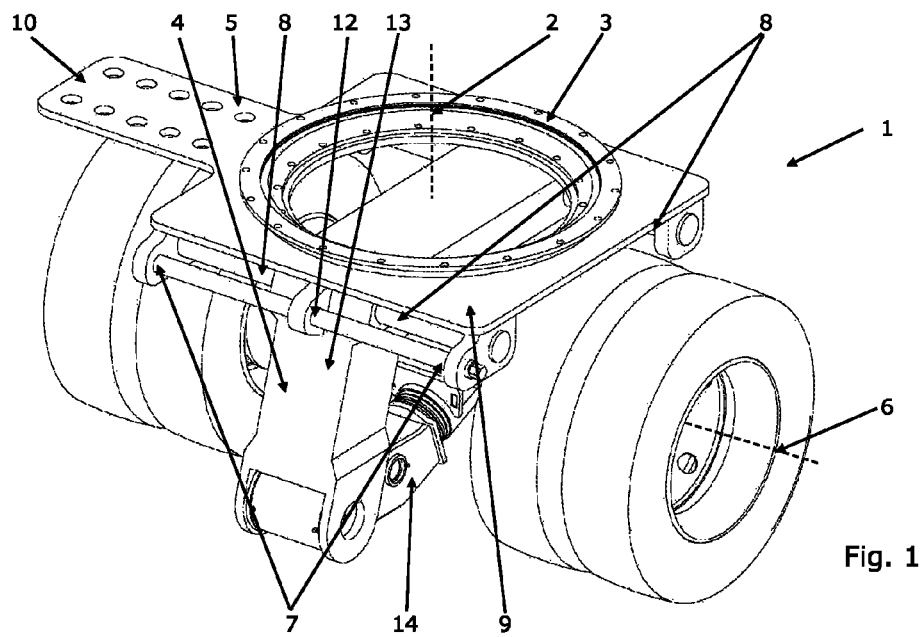
FIG. 1 shows an axle suspension according to the invention.

FIG. 1 shows a perspective representation of an axle suspension 1 according to the invention. This axle suspension 1 has an axle support 4 that is mounted in a swivel 3 so as to rotate about an axis of rotation 2. The axle support 4 is connected with a steering lever 5 in torque-proof manner. This arrangement has the result that pivoting movements of the steering lever 5 about the axis of rotation 2 are transferred to the axle support 4 and thereby to the wheel axle 6 carried by the axle support 4. The wheel axle 6 preferably has a width of 150 cm (centimeters) to 220 cm (centimeters). The axle support 4 is mounted so as to be displaceable relative to the axis of rotation 2, in the direction of wheel axle 6. The axle support 4 is therefore displaceable, relative to the axis of rotation 2, which is formed by the swivel 3, in the direction in which the wheel axis of wheel axle 6 projects on the axle support 4. In order to allow such displacement, guides 8 are provided on the steering lever 5 that accommodates the swivel 3, which guides represent the mounting of the axle support 4 and make an adjustment path 7 available, on which the axle support 4 is displaceable. In the exemplary embodiment according to FIGS. 1 to 8, the axle support 4 is divided into two parts, into an upper axle support part 13 and a lower axle support part 14. Such division into two parts allows a height adjustment in the axle suspension 1, which is preferably driven pneumatically or hydraulically.

Figure 2:
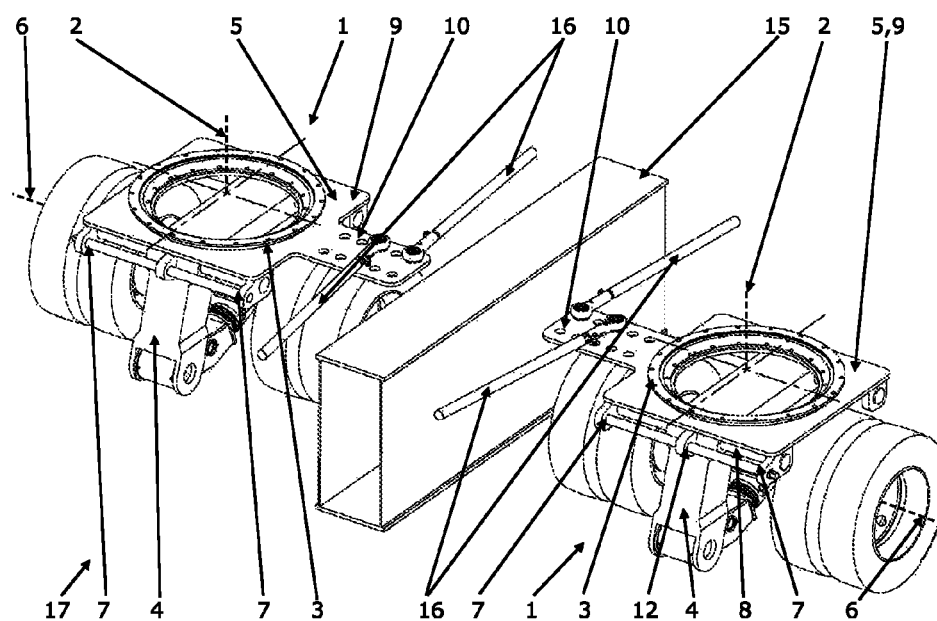
FIG. 2 shows a vehicle axle having two axle suspensions.

FIG. 2 shows extracts of the arrangement of two axle suspensions 1 in a vehicle chassis 15 of a vehicle, relative to a common vehicle axle 17. The two axle suspensions 1 are disposed in such a manner that the wheel axles 6 are oriented coaxial to one another in the normal position shown. The steering levers 5 and thereby the axle supports 4 connected with them in torque-proof manner are mounted so as to rotate about the axes of rotation 2, by way of the swivels 3. Such a rotational movement is transferred by means of the steering rods 16 mounted on the lever arm 10 of the steering lever 5, and changes the position of the axle suspensions 1 from the normal position about the axis of rotation 2. The position of the steering lever 5 about the axis of rotation 2, as well as the steering angle brought about by the steering rod 16, do not change with regard to the vehicle chassis 15 when the axle support 4 is displaced on the adjustment path 7 by means of the guides 8. The advantage of the axle suspension 1 according to the invention is shown directly here, because in the case of a change in the track width by means of displacement of the axle supports 4 on the guides 8, no change is required at the steering rods 16, because the axes of rotation 2 of the axle suspensions 1 are fixed in place in their position on the vehicle chassis 15 in such a manner that no adaptation of the steering rod lengths is required when the track width changes.

Figure 3:
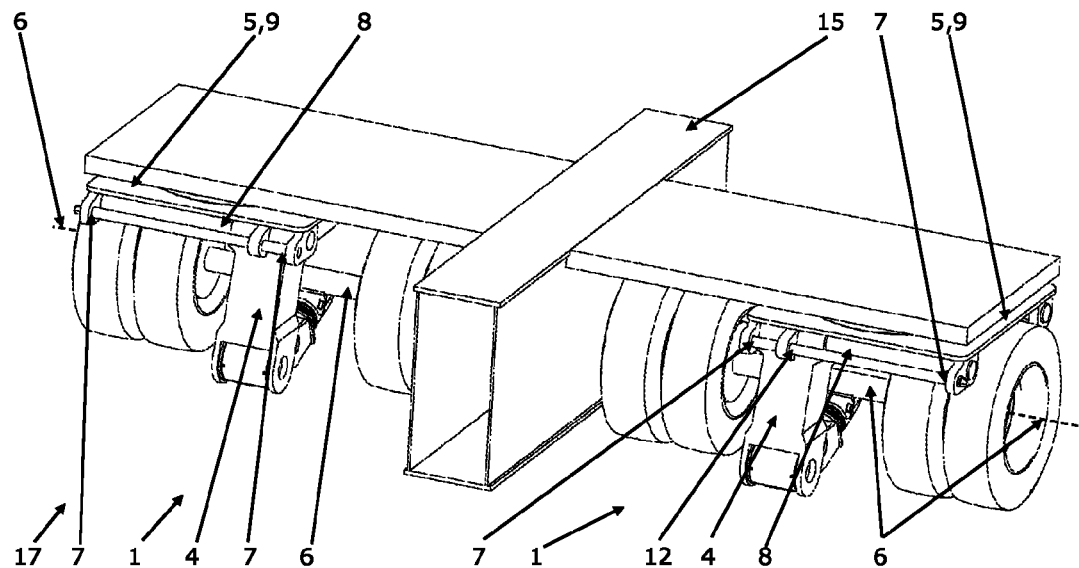
FIG. 3 shows a vehicle chassis having a vehicle axle with a narrow track width.

FIG. 3 shows a vehicle axle 17 set to a narrow track width. For this purpose, the axle suspensions 1 are set in such a manner that the axle supports 4 mounted on the steering plates 9 in the guides 8 are positioned toward the center of the vehicle at the end position of the adjustment path 7. The axle supports 4 can thereby be pushed apart out of one another on the guides 8 merely over the respective adjustment path 7, in the direction of wheel axle 6. For this displacement, an adjustment device 12 can be provided, which device preferably has a threaded spindle and/or a hydraulic cylinder. Preferably, the threaded spindle should have a trapezoid thread and furthermore advantageously have a diameter of at least 42 mm (millimeters). The guides 8 ensure a corresponding adjustment path 7 in the direction of wheel axle 6, because they are oriented parallel to the wheel axle 6.

Figure 4:
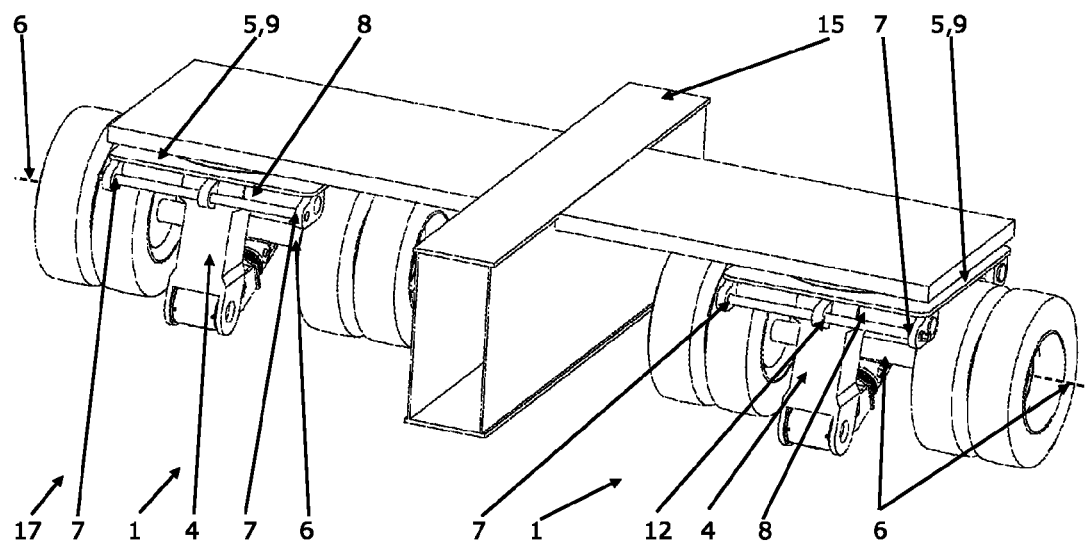
FIG. 4 shows a vehicle chassis having a vehicle axle with a medium track width.

FIG. 4 shows a vehicle chassis 15 having a vehicle axle 17 adjusted to a medium track width. As can be seen, the axle supports 4 are mounted on the guides 8 at the respective steering lever 5 in the center of the adjustment path 7. The wheel axles 6 continue to be oriented coaxially in the normal position relative to one another. Here, the axle support 4 can now be displaced in both directions of the wheel axle 6, by way of the adjustment device 12 on the axle suspensions 1. Therefore the track width can be reduced in size to an axle support position according to FIG. 3 or widened to an axle support position according to FIG. 5. The adjustment path 7 of each axle support 1 required for this purpose should have a length between 30 cm (centimeters) and 95 cm (centimeters), preferably 60 cm (centimeters). Preferably, a vehicle axle 17 should be adjustable between 425 cm (centimeters) and 615 cm (centimeters). The adjustment can take place in step-free or stepped manner. In each case, it is advantageous to be able to lock the axle supports 4 in place in the desired position. It is best if this locking takes place by means of a securing bolt, which is inserted through the guides 8 or a threaded spindle of the adjustment device 12. At the threaded spindle, securing by way of a counter-nut could also take place. The guides 8 on the steering lever 5 absorb the forces that are transferred from the wheel axle 6 to the axle support 4 here. The guides 8 in turn pass the absorbed forces on to the steering plate 9 and the swivel 3, where support relative to the vehicle chassis 15 takes place.

Figure 5:
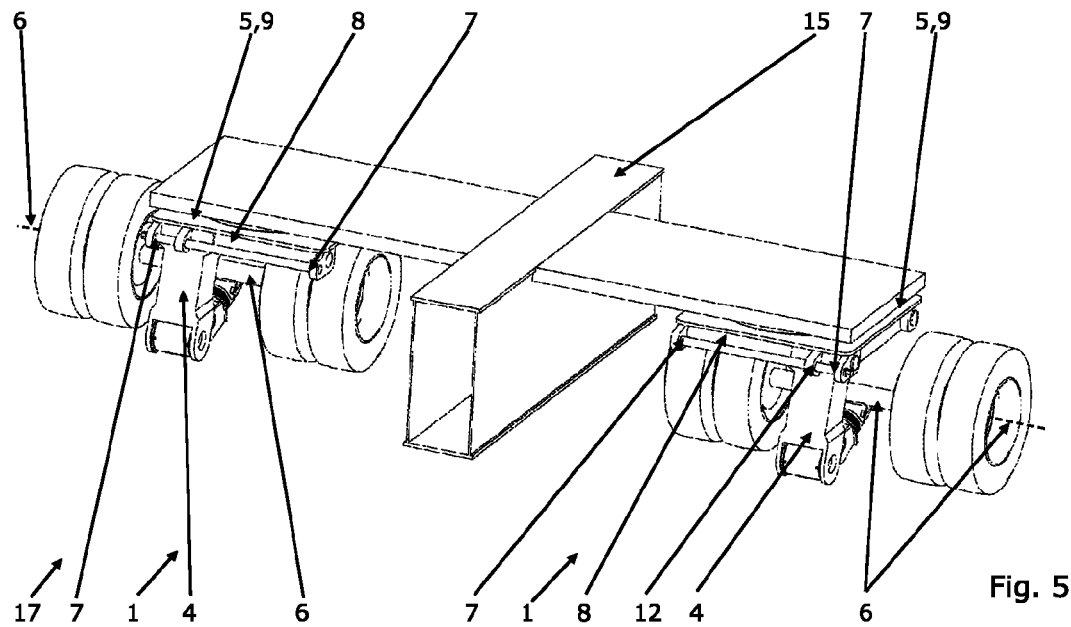
FIG. 5 shows a vehicle chassis having a vehicle axle with a wide track width.

In FIG. 5, a vehicle chassis 15 with the vehicle axle 17 in the widest track width is shown. The axle supports 4 are in their outermost position on the adjustment path 7, seen from the center of the vehicle, which path runs parallel to the wheel axles 6. The axle supports 4 can be displaced over the entire adjustment path 7 toward the center of the vehicle in this position by means of the adjustment device 12, in order to set a narrower track width once again.

Figure 6:
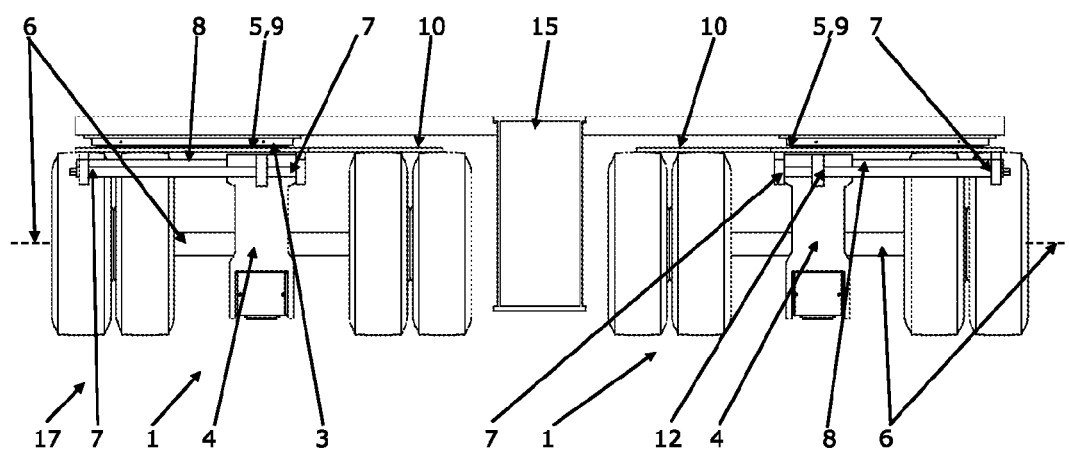
FIG. 6 is a front view of a vehicle chassis having a vehicle axle with a narrow track width.

FIG. 6 represents a front view of the vehicle axle 17 shown in FIG. 3. As can be seen, the axle supports 4 of the axle suspension 1 are situated on the inner end position of the adjustment path 7, so that a narrow track width occurs. In this view, not only the respective steering plate 9 of the steering lever 5 but also its lever arm 10 can be seen, with which arm the axle suspensions 1 can be rotated in the swivel 3. The wheel axles 6 of the two opposite axle suspensions 1 are oriented coaxial to one another in the normal position. This coaxiality is given up in the case of steering movements out of the normal position. Furthermore, it is conceivable that only one of the two axle suspensions 1 is adjusted in its height by way of the axle support 4, so that no coaxiality exists any longer. It is furthermore possible to structure the wheel axles 6 so as to be adaptable to a curved subsurface. The wheel axles 6 can thereby balance out uneven areas of the subsurface, by means of corresponding articulations on the axle support 4. In this way, too, coaxiality would exist outside of the normal position, temporarily dependent on a curvature of the subsurface.

Figure 7:
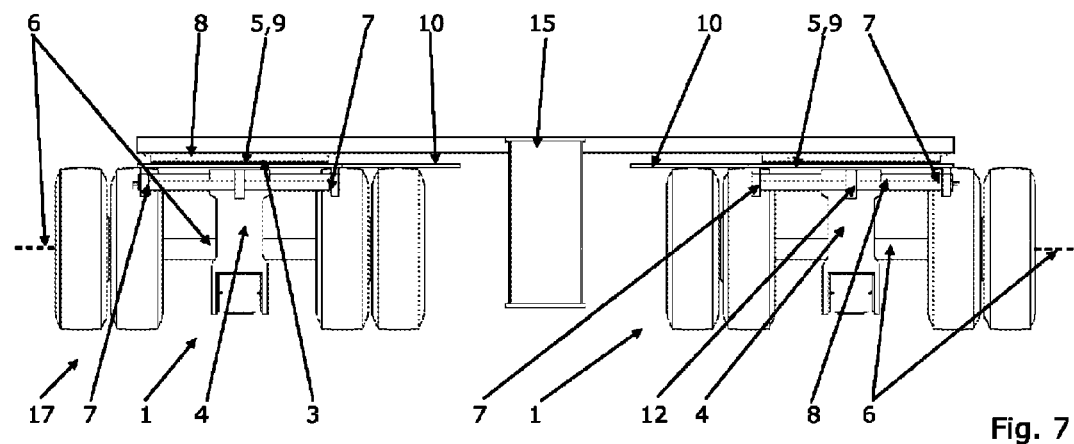
FIG. 7 is a front view of a vehicle chassis having a vehicle axle with a medium track width.

FIG. 7 shows the front view of the vehicle chassis 15 shown in FIG. 4 adjusted to a medium track width. The respective axle support 4 of the axle suspensions 1 can be displaced by way of the adjustment device 12, on the guides 8, over the adjustment path 7, in both directions of the wheel axles 6, in other words toward the center of the vehicle or away from the center of the vehicle. As can be seen the position of the swivels 3, of the steering levers 5, and, in particular, of the lever arms 10, is unchanged as compared with FIG. 6, in spite of the displacement of the axle supports 4 away from the center of the vehicle. Therefore a steering rod 16 engaging on the lever arm 10 would not have to be changed in length, although a change in the track width has taken place.

Figure 8:
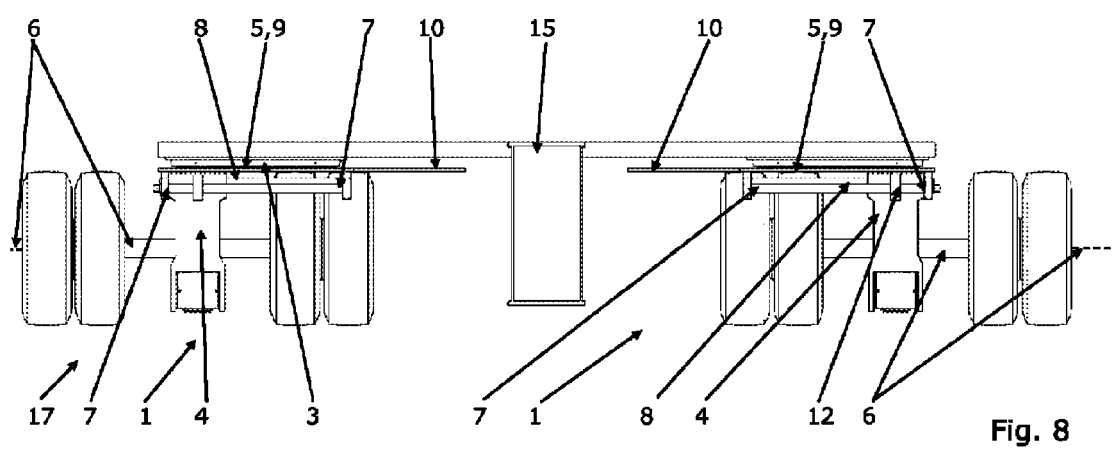
FIG. 8 is a front view of a vehicle chassis having a vehicle axle with a wide track width, as well as FIG. 9 is an axle suspension having an alternative axle support guide.

FIG. 8 shows the front view of the vehicle chassis 15 from FIG. 5 in the widest adjustable track width. Here, too, the position of the swivels 3 as well as of the steering levers 5, particularly of the lever arms 10, is unchanged as compared with FIGS. 6 and 7, although the axle supports 4 are positioned in the outermost end position on the adjustment path 7, viewed from the center of the vehicle.

Figure 9:
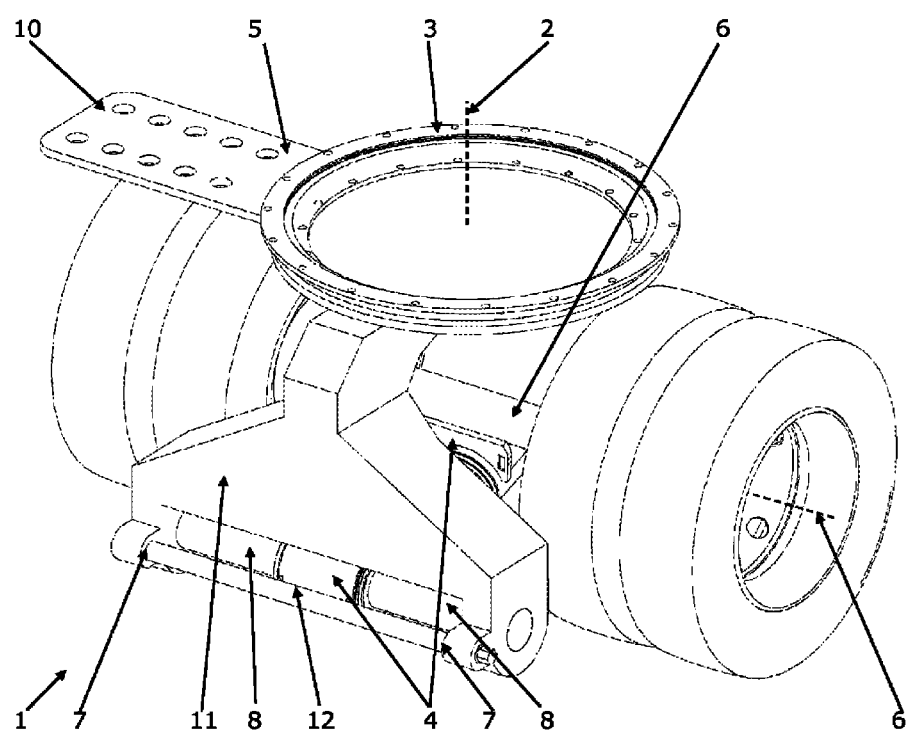

FIG. 9 shows an axle suspension 1 with an alternative guide 8 of the axle support 4. In this embodiment, the steering lever 5 has not only the lever arm 10 but also an axle support accommodation 11, which is provided with guides 8 on which the axle support 4 is mounted so as to be displaceable on an adjustment path 7, in the direction of wheel axle 6.

The advantage of such an embodiment is the particularly low construction height of the axle suspension 1, because the guide is mounted ahead of the wheel axle 6 by means of the axle support accommodation 11. The axle support accommodation 11 is firmly connected with the steering lever 5 and the lever arm 10, so that steering movements about the axis of rotation 2 of the swivel 3 are transferred to the axle support 4 and thereby to the wheel axle 6 by way of the guides 8 on the axle support accommodation 11. This embodiment also guarantees that the axle support 4 is mounted to be displaceable on an adjustment path 7, relative to the axis of rotation 2, in the wheel axle direction 6.

Thus, although only a few embodiments of the present invention have been shown and described, it is to be understood that many changes and modifications may be made thereunto without departing from the spirit and scope of the invention.

What is claimed is:

1. An axle suspension comprising:
   (a) a swivel;
   (b) an axle support mounted in the swivel so as to rotate about an axis of rotation;
   (c) a steering lever connected with the axle support in torque-proof manner and pivotable about the axis of rotation; and
   (d) at least one wheel axle accommodated in the axle support;
   wherein the axle support is mounted to be displaceable relative to the axis of rotation in a wheel axle direction on an adjustment path while a position of the swivel, the axis of rotation, and the steering lever remains unchanged.

2. The axle suspension according to claim 1, wherein mounting of the axle support on the adjustment path takes place by guides on the steering lever.

3. The axle suspension according to claim 2, wherein the steering lever is configured as a steering plate that has the guides and comprises a lever arm.

4. The axle suspension according to claim 2, wherein the steering lever comprises a lever arm and has an axle support accommodation that has the guides.

5. The axle suspension according to claim 4, wherein the axle support is lockable in place on the adjustment path.

6. The axle suspension according to claim 2, wherein the axle support is adjustable on the adjustment path along an entire length of the guides.

7. The axle suspension according to claim 1, wherein the axle support is adjustable on the adjustment path in steps.

8. The axle suspension according to claim 1, further comprising an adjustment device adjusting the axle support on the adjustment path.

9. The axle suspension according to claim 1, wherein the adjustment path has a length between 30 cm and 95 cm.

10. The axle suspension according to claim 9, wherein the length is 60 cm.

11. The axles suspension according to claim 1, wherein the axle support has at least one upper axle support part and one lower axle support part and is adjustable in height.

12. The axle suspension according to claim 11, wherein the axle support is adjustable in height pneumatically or hydraulically.

13. A vehicle comprising at least a first axle suspension, wherein the first axle suspension comprises:
   (a) a swivel;

(b) an axle support mounted in the swivel so as to rotate about an axis of rotation;
(c) a steering lever connected with the axle support in torque-proof manner and pivotable about the axis of rotation; and
(d) at least one wheel axle accommodated in the axle support;
wherein the axle support is mounted to be displaceable relative to the axis of rotation in a wheel axle direction on an adjustment path while a position of the swivel, the axis of rotation, and the steering lever remains unchanged.

14. The vehicle according to claim 13, further comprising at least one steering rod transferring steering movements to the first axle suspension by way of the steering lever.

15. The vehicle according to claim 13, further comprising a second axle suspension, wherein the first and second axle suspensions are disposed in a common vehicle axle.

16. The vehicle according to claim 15, wherein the vehicle has at least two vehicle axles.

* * * * *